(12) United States Patent
Zhang et al.

(10) Patent No.: US 11,811,017 B2
(45) Date of Patent: Nov. 7, 2023

(54) BATTERY UNIT AND BATTERY MODULE

(71) Applicant: Contemporary Amperex Technology Co., Limited, Fujian (CN)

(72) Inventors: Jie Zhang, Ningde (CN); Zhijun Guo, Ningde (CN); Peng Wang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 297 days.

(21) Appl. No.: 16/746,478

(22) Filed: Jan. 17, 2020

(65) Prior Publication Data
US 2020/0243896 A1    Jul. 30, 2020

(30) Foreign Application Priority Data

Jan. 30, 2019  (CN) .......................... 201910088350.0

(51) Int. Cl.
*H01M 50/55*  (2021.01)
*H01M 50/536*  (2021.01)
(Continued)

(52) U.S. Cl.
CPC ..... *H01M 10/0454* (2013.01); *H01M 50/176* (2021.01); *H01M 50/536* (2021.01); *H01M 50/55* (2021.01); *H01M 50/553* (2021.01)

(58) Field of Classification Search
CPC ............. H01M 10/0454; H01M 50/54; H01M 50/543; H01M 50/528; H01M 10/0431; H01M 50/538
See application file for complete search history.

(56) References Cited

U.S. PATENT DOCUMENTS 9,083,039 B2    7/2015  Kim
2011/0318633 A1    12/2011  Kim et al.
(Continued)

FOREIGN PATENT DOCUMENTS

CN    201845835 U    5/2011
CN    103367668 A    10/2013
(Continued)

OTHER PUBLICATIONS

European Search Report for European Application No. 20153472.4, European Patent Office, Munich, Germany, dated Jun. 22, 2020, 8 pages.
(Continued)

*Primary Examiner* — Niki Bakhtiari
*Assistant Examiner* — Grace Ann Kenlaw
(74) *Attorney, Agent, or Firm* — Sterne, Kessler, Goldstein & Fox P.L.L.C.

(57) ABSTRACT

A battery unit and a battery module, where the battery unit includes an electrode assembly, including a first electrode and a second electrode, which have opposite polarities, each of the first electrode and the second electrode includes a coated portion and an uncoated portion, and the uncoated portion is located at an end part of a coated portion along the length direction of the electrode assembly and forms a tab; two terminals, arranged at the top of the electrode assembly; and two current collectors for electrically connecting the tabs on both sides of the electrode assembly with the terminals on the same side respectively. At least one end of at least one current collector along the width direction of the electrode assembly is a flat plate structure, and the tab covers the flat plate structure from the outer side after being bent.

15 Claims, 12 Drawing Sheets

(51) Int. Cl.
    *H01M 10/04*     (2006.01)
    *H01M 50/553*     (2021.01)
    *H01M 50/176*     (2021.01)

(56) References Cited

U.S. PATENT DOCUMENTS

| | | | | |
|---|---|---|---|---|
| 2013/0330593 | A1* | 12/2013 | Kim | H01M 50/531 |
| | | | | 429/149 |
| 2015/0340662 | A1* | 11/2015 | Kwon | H01M 50/538 |
| | | | | 429/94 |
| 2016/0211499 | A1 | 7/2016 | Cho | |
| 2019/0067667 | A1* | 2/2019 | Jang | H01M 50/531 |

FOREIGN PATENT DOCUMENTS

| | | |
|---|---|---|
| CN | 103490039 A | 1/2014 |
| CN | 104300096 A | 1/2015 |
| CN | 105762322 A * | 7/2016 ........ H01M 10/0583 |
| CN | 105762322 A | 7/2016 |
| CN | 205385061 A | 7/2016 |
| CN | 206432307 U | 8/2017 |
| CN | 206574809 U | 10/2017 |
| CN | 207587831 U | 7/2018 |
| CN | 108598353 A | 9/2018 |
| CN | 207818736 U | 9/2018 |
| CN | 208014793 U | 10/2018 |
| DE | 102014019505 | 12/2014 |
| DE | 102016200405 | 1/2016 |

OTHER PUBLICATIONS

International Search Report and Written Opinion of the International Searching Authority in related International Application No. PCT/CN2020/072409 dated Apr. 15, 2020, 15 pages.

* cited by examiner

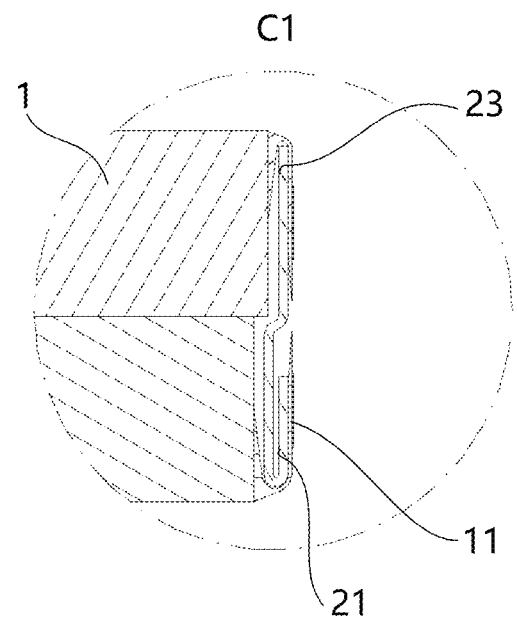
Fig. 11
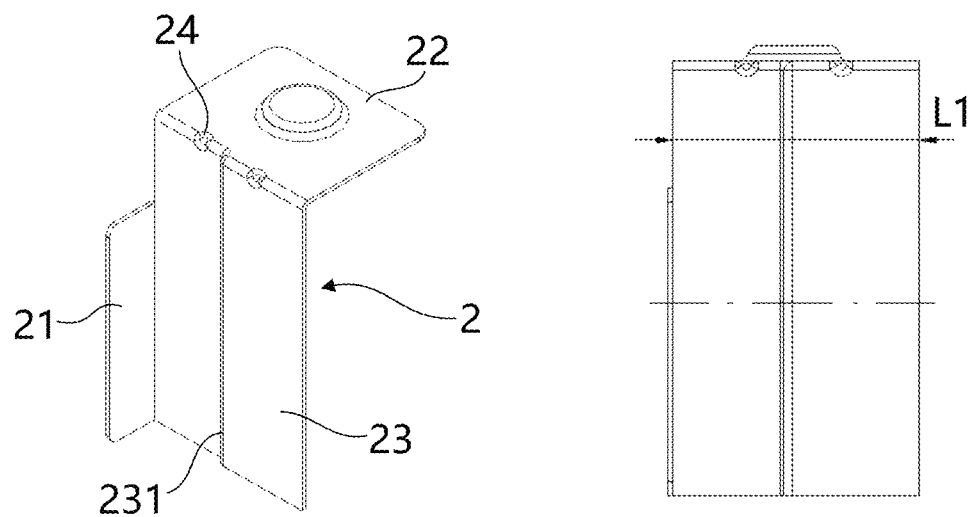
Fig. 12A
Fig. 12B

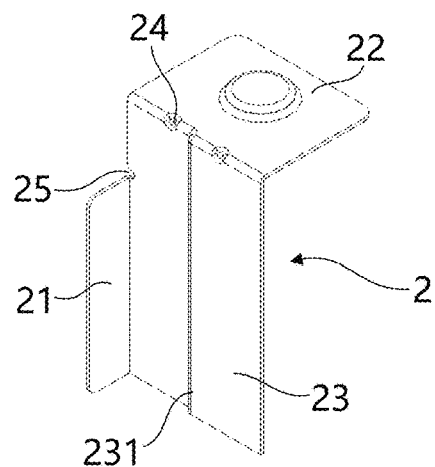 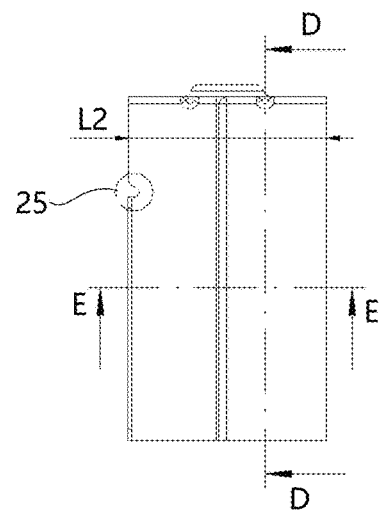
Fig. 13A　　　　　　　　　Fig. 13B
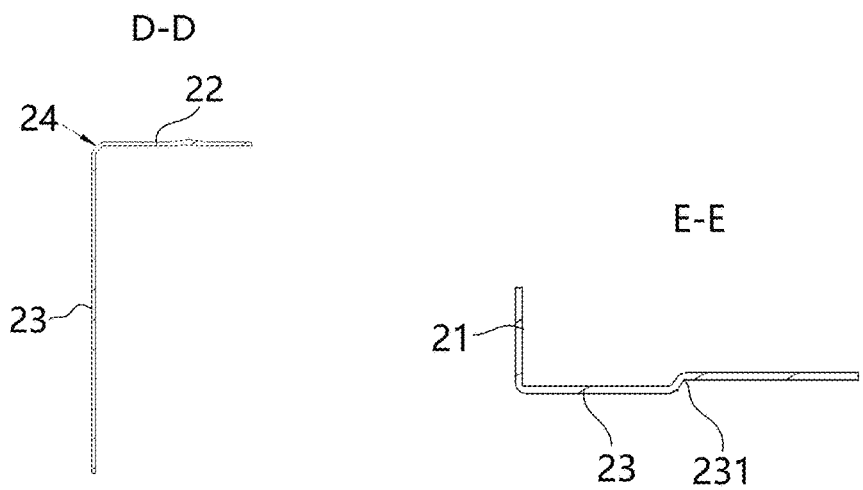
Fig. 13C　　　　　　　　　Fig. 13D
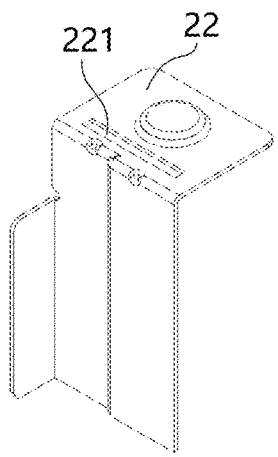
Fig. 14

BATTERY UNIT AND BATTERY MODULE

The present application claims priority of Chinese application No. 201910088350.0, filed on Jan. 30, 2019. The disclosed content of the Chinese application is hereby entirely incorporated into the present disclosure by reference thereto.

FIELD OF THE DISCLOSURE

The present disclosure relates to the technical field of batteries, and in particular, to a battery unit and a battery module.

BACKGROUND OF THE DISCLOSURE

In recent years, rechargeable batteries have been widely used for providing power for high-power devices, such as electric vehicles and the like. The rechargeable batteries achieve greater capacity or power by connecting a plurality of battery units in series or in parallel.

The existing battery unit is provided with an electrode assembly in the shell, the electrode assembly is formed by superposing and winding a positive pole piece, a diaphragm and a negative pole piece, and the positive pole piece and the negative pole piece respectively include a coated portion and an uncoated portion, and the uncoated portion forms a tab, the tabs on both sides of the electrode assembly are respectively connected with positive and negative pole columns at the top of the shell through current collectors. In the related art known to the inventors, the current collectors on the both sides of the electrode assembly are of bent structures.

SUMMARY OF THE DISCLOSURE

According to one aspect of the present disclosure, a battery unit is provided, including:

an electrode assembly, including a first electrode and a second electrode, which have opposite polarities, each of the first electrode and the second electrode includes a coated portion and an uncoated portion, and the uncoated portion is located at an end of a coated portion along a length direction of the electrode assembly and forms a tab;

two terminals, arranged at the top of the electrode assembly; and two current collectors electrically connecting the tabs on both sides of the electrode assembly with the terminals on the same side respectively;

wherein at least one end of at least one current collector along the width direction of the electrode assembly is a flat plate structure, and the tab covers the flat plate structure from the outer side after being bent.

In some embodiments, the battery unit includes at least two electrode assemblies, the two current collectors are a first current collector and a second current collector respectively located on the both sides of the electrode assemblies, one end of each of the first current collector and the second current collector along the width direction is the flat plate structure, and the other end of each of the first current collector and the second current collector along the width direction is provided with a bent portion which is folded towards the opposite end.

In some embodiments, all the bent portions are located on the same side or on different sides of the electrode assembly along the width direction.

In some embodiments, the electrode assembly on a side of the flat plate structure protrudes outwards along the length direction with respect to the electrode assembly on a side of the bent portion, each of the two current collectors includes a main body portion, the bent portion is arranged on the end of the main body portion along the width direction, the main body portion is bent to form a step, and a step is configured to adapt at a position where the two electrode assemblies are adjacent, and the step is configured to adapt to the protrusion direction and the size of the electrode assembly.

In some embodiments, the two current collectors include a first current collector and a second current collector, which are respectively located on the both sides of the electrode assemblies, and both ends of one of the first current collector and the second current collector along the width direction are the flat plate structures.

In some embodiments, the battery unit includes only one electrode assembly, the first end of the first current collector along the width direction is the flat plate structure, the second end of the first current collector is provided with a bent portion which is folded back towards the first end, and both ends of the second current collector along the width direction are the flat plate structures.

In some embodiments, the battery unit includes at least two electrode assemblies, both ends of the first current collector along the width direction are respectively provided with a bent portion, and the two bent portions are bent towards each other, and both ends of the second current collector along the width direction are the flat plate structures.

In some embodiments, the battery unit includes at least two electrode assemblies, the tabs of the electrode assemblies are led out from both sides of the current collector along the width direction, and the tabs on both sides of the current collector have no overlapping portion on the width direction after being folded.

In some embodiments, the battery unit includes at least two electrode assemblies, the tabs of the electrode assemblies are led out from the both sides of the current collector along the width direction, a plurality of tabs are arranged on at least one side along the height direction of the current collector, and the tabs on the same side are completely staggered along the height direction.

In some embodiments, the current collector includes:

a terminal connection portion, located at the top of the electrode assembly and connected with the terminal;

a main body portion, located on a side of the electrode assembly along the length direction; and a bent portion, arranged at the end of the main body portion along the width direction and connected with the tab;

wherein the tab is bent from the outer side to cover the bent portion, and the bent portion is fitted with the main body portion after being folded.

In some embodiments, a reinforcing rib is arranged at the connection portion of the terminal connection portion and the main body portion.

In some embodiments, a top face of the bent portion and the terminal connection portion are arranged at intervals, and a notch is formed on the top of the connection portion of the main body portion and the bent portion.

In some embodiments, the battery unit further includes a cover plate arranged on the top of the electrode assembly, wherein the main body portion has a first portion located close to the cover plate with respect to the notch, and the end of the first portion along the width direction is flush with the outer edge of the cover plate; and/or the main body portion has a second portion located away from the cover plate with respect to the notch, and the end part of the second portion along the width direction extends to an inner side face of root of the tab.

In some embodiments, the terminal connection portion, the main body portion and the bent portion are integrally formed.

In some embodiments, at least one side of the current collector along the width direction is provided with a bent portion which is folded back toward the opposite end, and bent portion offsets inward for a predetermined distance with respect to the edge of the end of the current collector along the width direction.

In some embodiments, both sides of the flat plate structure along the length direction are fitted with the tabs.

According to another aspect of the present disclosure, a battery module is provided, including:

a shell; and a plurality of battery units in the above embodiment, wherein the battery units are arranged in the shell and are arranged side by side along the width direction.

BRIEF DESCRIPTION OF THE ACCOMPANYING DRAWINGS

The drawings illustrated herein are used for providing a further understanding of the present disclosure and constitute a part of the present application, and the illustrative embodiments of the present disclosure and the descriptions thereof are used for explaining the present disclosure and do not constitute an undue limitation to the present disclosure. In the drawings:

FIG. 10 and FIG. 11 are respectively enlarged views of a location B1 and a location B2 in FIG. 9;

FIG. 12A and FIG. 12B are respectively a perspective view and a front view of a first current collector provided with no notch;

FIG. 13A and FIG. 13B are respectively a perspective view and a front view of the first current collector provided with a notch;

FIG. 13C and FIG. 13D are respectively D-D and E-E section views in FIG. 13;

FIG. 14 is a schematic diagram of a fusing structure arranged on the current collector corresponding to a positive electrode;

REFERENCE SIGNS

Figure 1:
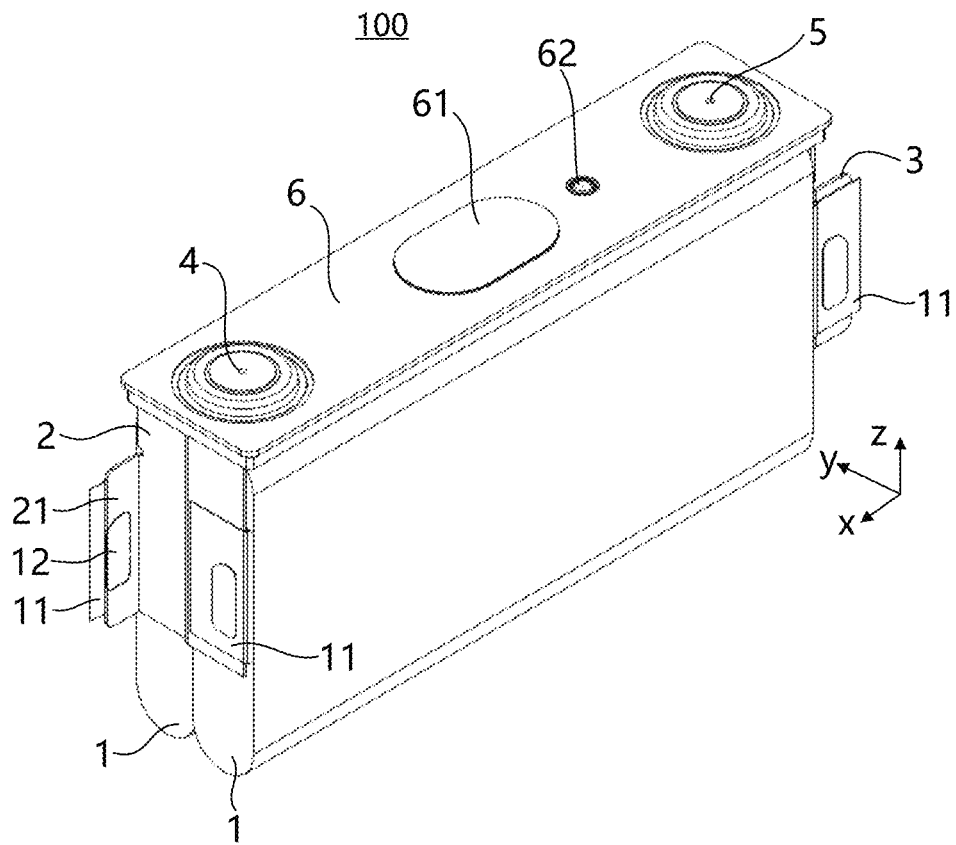
FIG. 1 is a perspective view of a bent portion of a current collector in an unfolded back state in some embodiments of a battery unit of the present disclosure.

1, electrode assembly; 11, tab; 12, protective sheet; 2, first current collector; 21, bent portion; 22, terminal connection portion; 221, groove; 23, main body portion; 231, step; 24, reinforcing rib; 25, notch; 3, second current collector; 4, first terminal; 5, second terminal; 6, cover plate; 61, exhaust member; 62, sealing member; 7, supporting seat.

DETAILED DESCRIPTION OF THE PREFERRED EMBODIMENTS

The present disclosure is described in detail below. In the following paragraphs, different aspects of the embodiments are defined in more detail. Aspects so defined can be combined with any other one or more aspects, unless clearly indicated that they are not combinable. In particular, any feature that is considered to be preferred or advantageous can be combined with the other one or more features that are considered to be preferred or advantageous.

The terms "first", "second" and the like appearing in the present disclosure are merely for the convenience of description to distinguish different components having the same name, and do not indicate a sequential or primary and secondary relationship.

In addition, when an element is referred to as being "on" another element, the element can be directly on the other element, or can be indirectly on the other element and one or more intermediate elements are inserted there between. In addition, when an element is referred to be "connected to" another element, the element can be directly connected to the other element or can be indirectly connected to the other element and one or more intermediate elements are inserted there between. The same reference sign denotes the same element below.

In order to clearly describe various orientations in the following embodiments, for example, various directions of a battery unit are defined in a coordinate system in FIG. 1, the x direction represents the length direction of the battery unit; the y direction is perpendicular to the x direction in the horizontal plane, and represents the width direction of the battery unit; the z direction is perpendicular to a plane formed by the x and y directions, and represents the height direction of the battery unit. Based on this orientation definition, the description of orientation or positional relationships indicated by "upper", "lower", "top", "bottom", "front", "back", "inside" and "outside" is used for the convenience of describing the present disclosure only, rather than indicating or implying that the device referred to must have a specific orientation, be constructed and operated in a specific orientation, and therefore should not be construed as limiting the protection scope of the present disclosure.

In the related art known to the inventors, the current collectors on the both sides of the electrode assembly are of bent structures to improve the welding and fixing reliability with the tab by increasing its own structural strength, but greater spaces are occupied on the both sides of the electrode assembly in this manner of connecting the current collectors with the tabs, and in the case that the volume of the battery unit is constant, the winding space is reduced, thereby reducing the energy density of the battery. Therefore, the present disclosure makes improvement to the battery unit, and provides a battery unit and a battery module which can effectively improve the energy density of a battery.

According to the above technical solutions, in the battery unit in some embodiments of the present disclosure, at least one end of at least one current collector along the width direction of the electrode assembly is the flat plate structure, and the tab covers the flat plate structure from the outer side after being bent. This battery unit can reduce the space occupied by a connecting structure of the tab and the current collector at a side end of the electrode assembly, and can increase the winding space, thereby effectively improving the energy density of the battery unit.

In order that those skilled in the art can understand the improvement points of the present disclosure more clearly, the overall structure of the battery unit will be described at first.

FIG. 1 schematically shows a structural schematic diagram of some embodiments of a battery unit of the present disclosure. The battery unit can include an electrode assembly 1, a cover plate 6, two terminals and two current collectors. Wherein the electrode assembly 1 includes a first electrode and a second electrode, which have opposite polarities, for example, the first electrode is a positive electrode and the second electrode is a negative electrode. Each of the first electrode and the second electrode includes a coated portion and an uncoated portion, and the uncoated portion is located at an end of a coated portion along the length direction of the electrode assembly 1 and forms a tab 11. The cover plate 6 is arranged on the top of the electrode assembly 1, and the cover plate 6 is provided with an exhaust member 61 and a liquid injection hole, the exhaust member 61 is used for releasing a gas in the battery unit to achieve a safety role, the liquid injection hole is used for injecting electrolyte into the battery unit and is sealed by a sealing member 62. The two terminals are arranged at both ends of the top of the electrode assembly 1 along the length direction, and include a first terminal 4 and a second terminal 5, which have opposite polarities. The two current collectors electrically connect the tabs on both sides of the electrode assembly 1 along the length direction with the terminals on the same side respectively.

When the battery unit is used independently, a sub-shell connected with the cover plate is further arranged at the outside of the electrode assembly 1, and the sub-shell is filled with the electrolyte. When a battery module is formed by a plurality of battery units, the battery module includes a shell and the plurality of battery units, the battery units are arranged in the shell and are arranged side by side along the width direction, and can be connected in parallel and/or in series, and the battery units can be separately provided with sub-shells, or the sub-shells are omitted.

Figure 17:
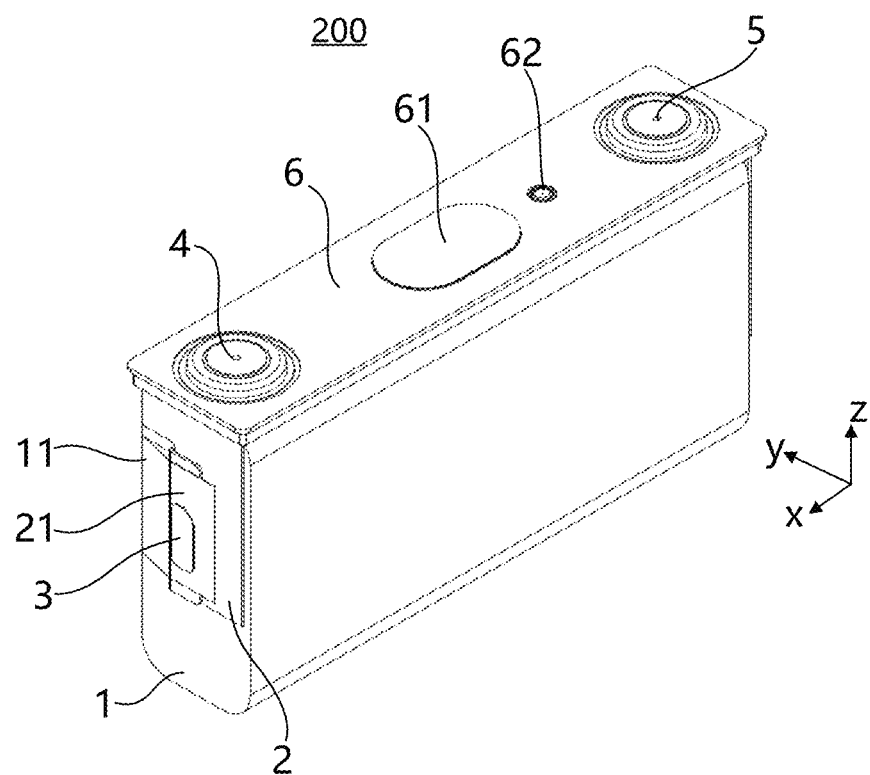
FIG. 17 is a perspective view of the bent portion of the current collector in the folded back state in another embodiment of the battery unit of the present disclosure.

As shown in FIG. 17, a single electrode assembly 1 in the battery unit can be provided, which is suitable for the situation in which the lamination thickness of electrode layers is relatively small.

As shown in FIG. 1, when the lamination thickness of the electrode layers is relatively large, two or more independently wound electrode assemblies 1 can be arranged in the battery unit, and the tabs 11 of all the electrode assemblies 1 are respectively led out from the both sides of the current collector. When the winding thickness of the electrode assembly 1 is relatively large, the size of the circular arc at the bottom is relatively large, resulting in a low space utilization rate of the electrode assembly 1 on the outer sides of the circular arcs on the both sides of the bottom, if the electrode assembly is split into a plurality of electrode assemblies 1, the size of the circular arc can be reduced, the bottom space of the battery unit is fully utilized, the space waste is reduced, and the energy density of the battery core is increased. Moreover, the total thickness of the tabs 11 is also reduced, which also facilitates the bending after welding, and the length of the unilateral tab 11 can be reduced.

Figure 5:
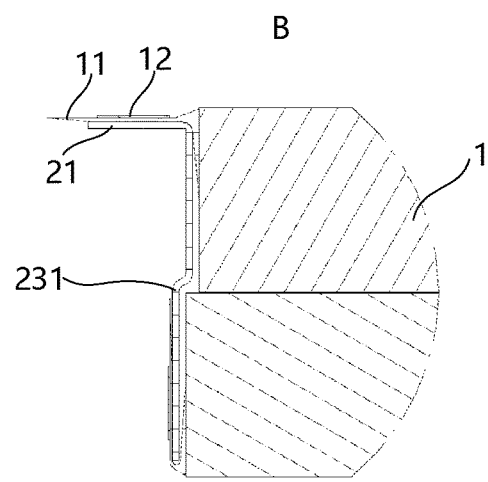
FIG. 5 and FIG. 6 are respectively enlarged views of a location B and a location C of the battery unit shown in FIG. 4.

In order to further improve the energy density of the battery unit, in some embodiments, at least one end of at least one current collector along the width direction of the electrode assembly 1 in the battery unit provided by the present disclosure is a flat plate structure, and the tab 11 covers the flat plate structure from the outer side after being bent, and the both sides of the flat plate structure along the length direction are fitted with the tabs 11. As shown in FIG. 5, an outer side face of the flat plate structure on the current collector is in contact with a portion of the tab 11 that stretches out and is folded back, an inner side face is in contact with the root of the tab 11, although there is a gap between the inner side face of the current collector and the root of the tab 11, the current collectors on the both sides are pressed with the electrode assembly 1 in the actual product.

In the present embodiment, by setting the at least one end of the current collector as the flat plate structure, and fitting the both sides of the flat plate structure along the length direction with the tab 11, the space occupied by a connecting structure of the tab 11 and the current collector at the side end of the electrode assembly 1 is reduced, and the winding space can be increased, thereby effectively improving the energy density of the battery unit.

A plurality of embodiments are described below based on the difference in the number and the positions of the flat plate structures.

FIG. 1 to FIG. 16 schematically show a structural schematic diagram of some embodiments of the battery unit of the present disclosure. As shown in FIG. 1, the battery unit 100 includes at least two electrode assemblies 1, the two current collectors include a first current collector 2 and a second current collector 3, which are respectively located on the both sides of the electrode assemblies 1 along the length direction, one end of each of the first current collector 2 and the second current collector 3 along the width direction is the flat plate structure, and the other end is provided with a bent portion 21.

Figure 2:
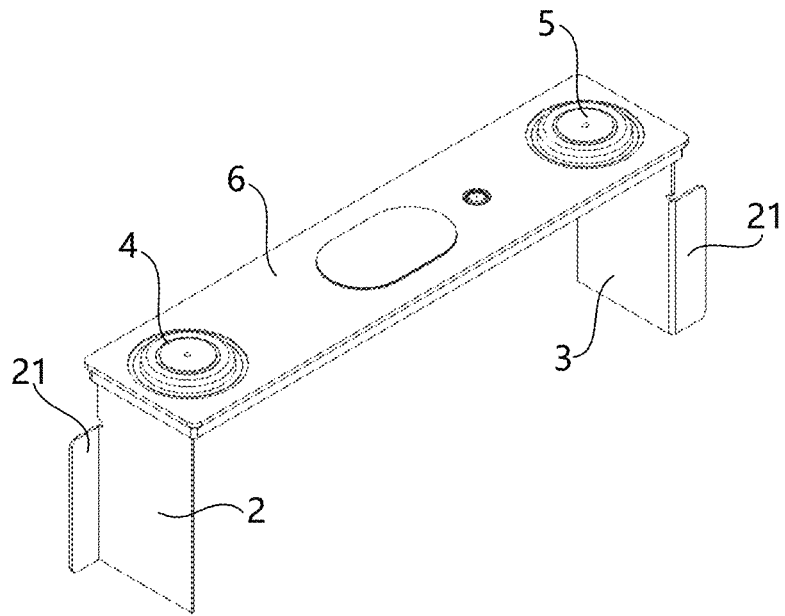
FIG. 2 is a schematic diagram of a structure for connecting the current collector with a cover plate in the battery unit shown in FIG. 1.

As shown in FIG. 1 and FIG. 2, the bent portion 21 of the first current collector 2 and the bent portion 21 of the second current collector 3 are located on different sides of the two electrode assemblies 1 along the width direction, the bent portion 21 can be arranged to form an included angle with a main body portion 23 of the current collector in an unfolded back state, for example, arranged to form 90°. The tabs 11 corresponding to the two electrode assemblies 1 are led out from both ends from the thickness direction, the tab 11 on one end covers the flat plate structure from the outer side after being bent, and the both sides of the flat plate structure along the length direction are fitted with the tab 11; and the tab 11 on the other end extends along the outer side of the bent portion 21. A protective sheet 12 is arranged on the outer side face of the tab 11, welding can be performed along the surrounding of the protective sheet 12, and the protective sheet 12, the tab 11 and the bent portion 21 form an entirety after the welding is completed, and the entirety is folded back, so that the bent portion 21 is fitted with the main body portion 23.

Figure 3:
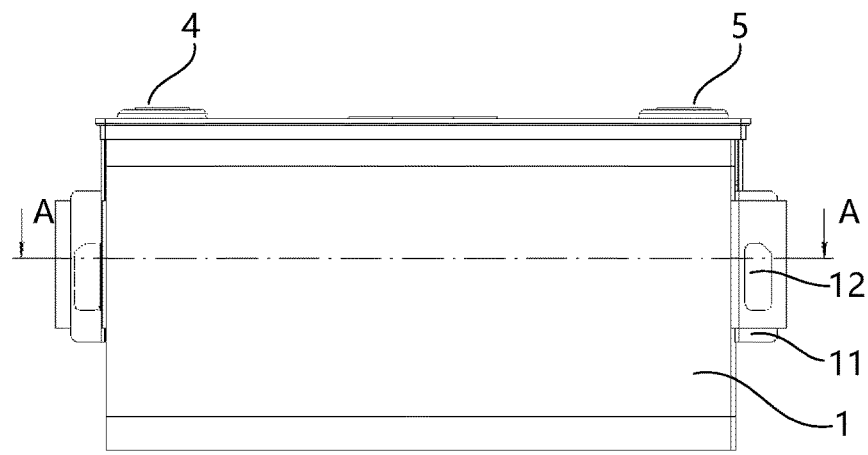
FIG. 3 is a front view of the battery unit shown in FIG. 1.
Figure 4:
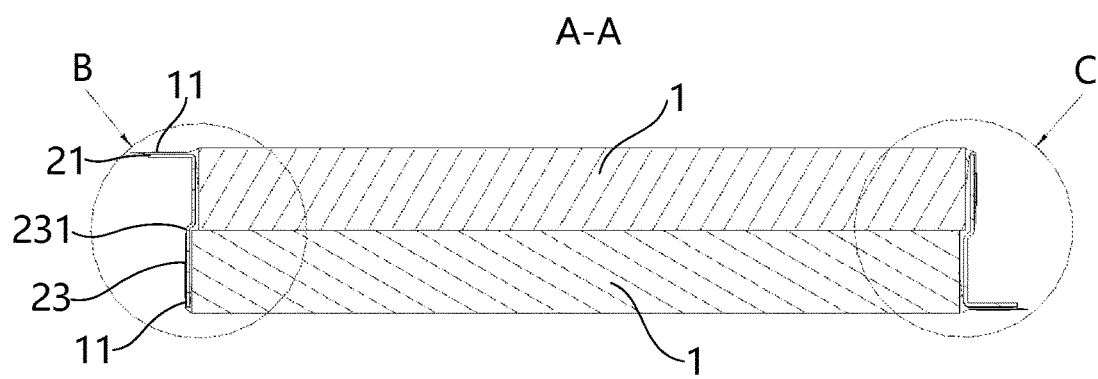
FIG. 4 is an A-A section view in FIG. 3.

FIG. 4 is an A-A section view of FIG. 3, after the tab 11 is bent to cover one end of the current collector provided with the flat plate structure, the thickness of a connecting structure of the current collector and the tab 11 can be reduced, therefore, the electrode assembly 1 on a side of the flat plate structure protrudes outwards along the length direction with respect to the electrode assembly 1 on a side of the bent portion 21, each of the two current collectors includes a main body portion 23, the bent portion 21 is arranged on the end of the main body portion 23 along the width direction, the main body portion 23 is bent to form a step 231 at a position where the two electrode assemblies 1 are adjacent, and the step 231 is configured to adapt to the protrusion direction and the size of the electrode assembly 1.

Figure 6:
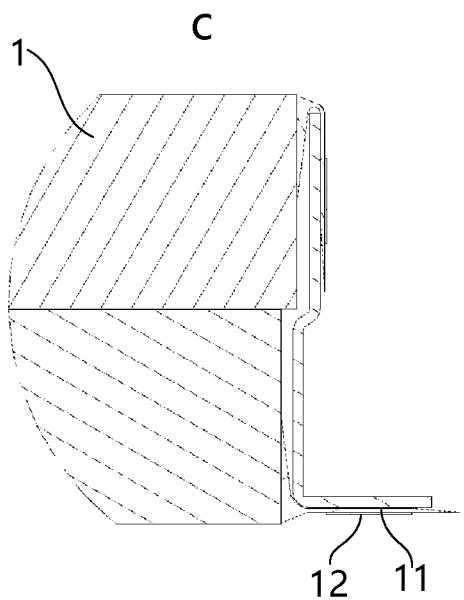

FIG. 5 and FIG. 6 are respectively enlarged views of a location B and a location C in FIG. 4, a turning portion of the step 231 can be obliquely arranged, the bent portion can be set as a circular arc transition structure to reduce the stress concentration of the main body portion 23 and improve the structural strength to prevent deformation.

By setting the main body portion 23 of the current collector as a stepped structure, the winding space of the battery core can be increased without increasing the overall size of the battery unit along the length direction, so that the energy density of the battery unit can be improved, and the power of the battery unit is improved.

As shown in FIG. 4, by setting the bent portions 21 on the different sides of the electrode assembly 1 along the width direction, the length sizes of the two electrode assemblies 1 can be kept to be consistent, thereby improving the versatility of the electrode assembly 1, improving the production efficiency, and reducing the cost. Moreover, such a structure is also conducive to welding the tabs 11 with the current collectors, and the reasons will be mentioned later in the description of the soldering step. Optionally, the bent portions 21 can also be located on the same side of the electrode assembly 1 along the width direction.

Figure 7:
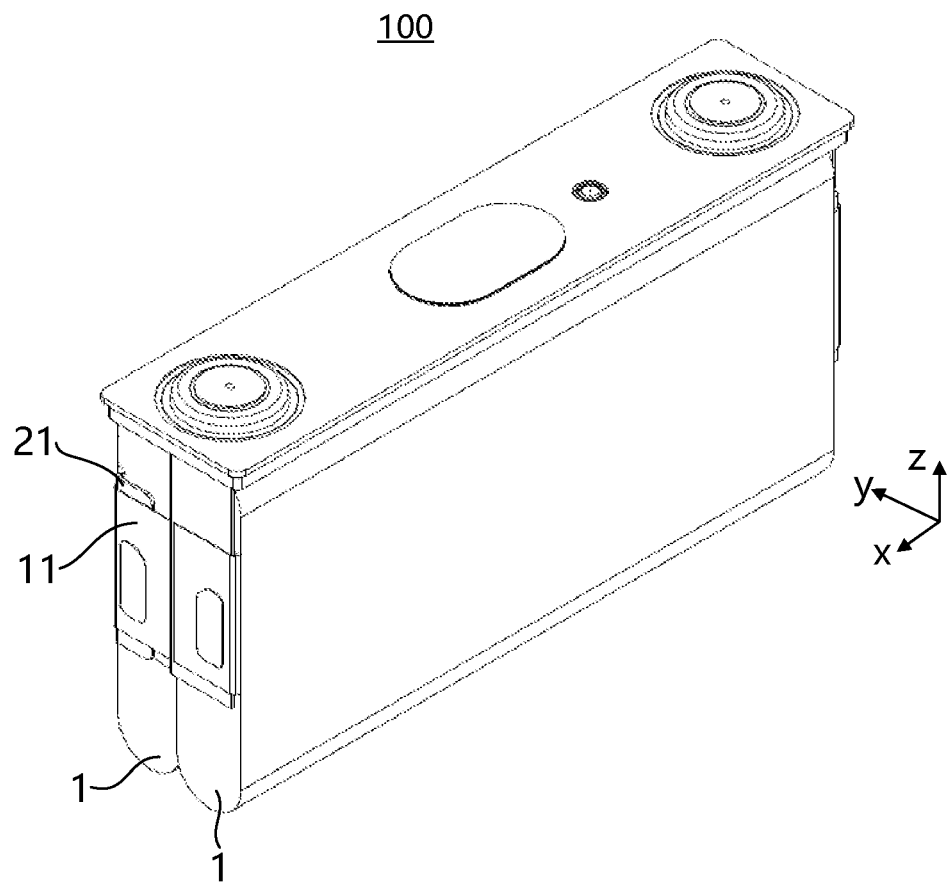
FIG. 7 is a perspective view of the bent portion of the current collector in a folded back state in the battery unit shown in FIG. 1.

FIG. 7 shows a structure after the bent portions 21 and the corresponding tabs 11 are folded back, the tabs 11 cover the bent portions 21 on the width direction, and the both ends of the bent portions 21 on the height direction can exceed or be flush with the tabs 11.

Figure 8:
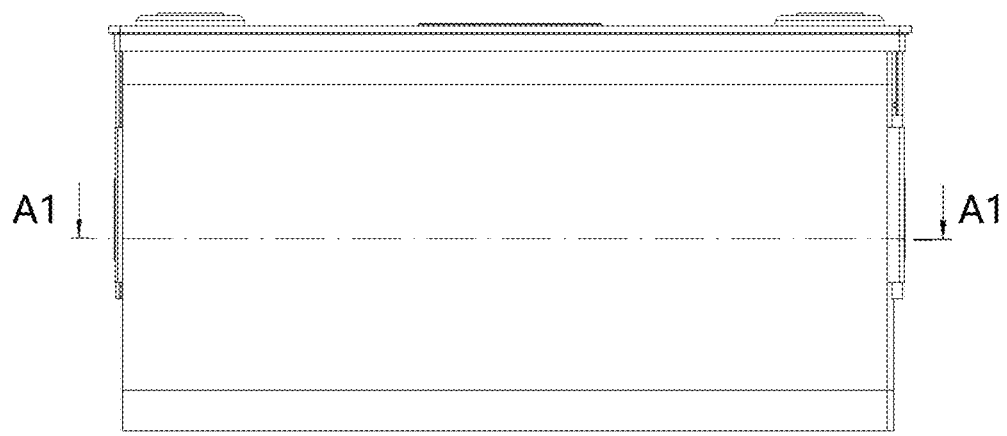
FIG. 8 is a front view of the battery unit shown in FIG. 7.
Figure 9:
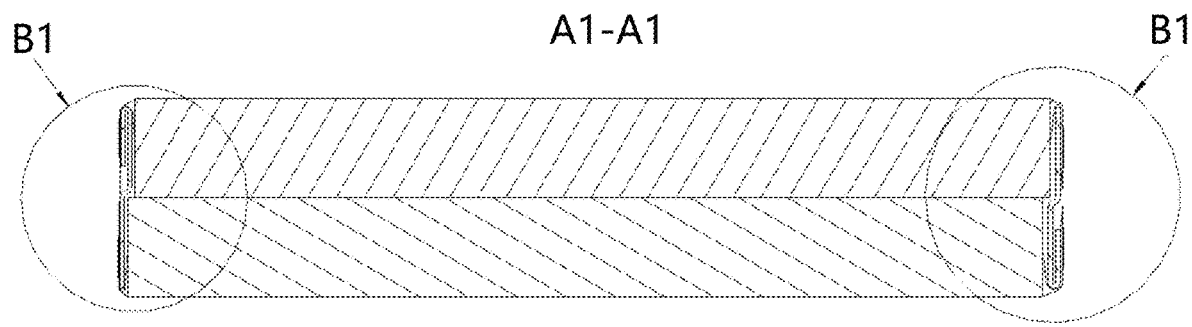
FIG. 9 is an A1-A1 section view in FIG. 8.

FIG. 8 is a front view of the battery unit shown in FIG. 7, FIG. 9 is a A1-A1 section view in FIG. 8, the battery unit includes at least two electrode assemblies 1, the tabs 11 of the electrode assemblies 1 are led out from the both sides of the current collector along the width direction, and the tabs 11 on the both sides have no overlapping portion on the width direction after being folded back, and the end parts of the tabs 11 on the both sides can contact with each other or have a gap with each other after being folded back. Such a structure makes the tabs 11 on both sides of the electrode assembly 1 along the width direction be independent from each other, so that the space occupied by the connecting structure of the tab 11 and the current collector on the length direction can be further reduced, thereby increasing the winding space and improving the energy density of the battery.

Further, the outer surfaces of the tabs 11 on both sides of the electrode assembly 1 along the width direction are flush with each other, so that the cross section of the battery unit can be formed into a rectangular structure, thereby making full use of the space to maximally increase the winding space in the case that the total length of the battery unit is constant. Furthermore, such a structure is easy to bend the tabs 11 on the both sides in place at the same time on the outer sides of the tabs 11 through a flat plate-shaped pressing tool, thereby improving the production efficiency.

Figure 10:
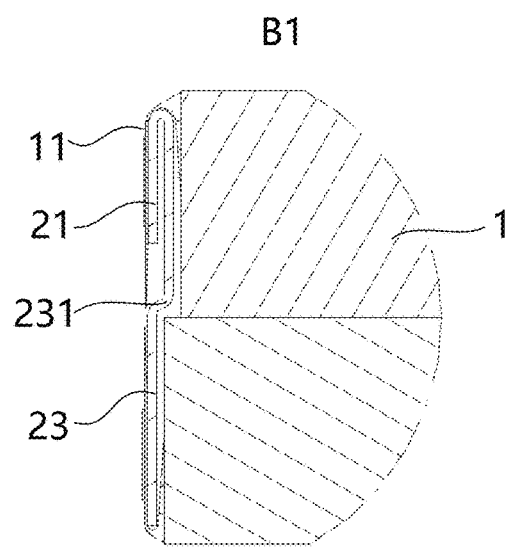

FIG. 10 and FIG. 11 are respectively enlarged views of a location B1 and a location C1 of the battery unit shown in FIG. 9, at one end of the current collector provided with the bent portion 21, the bent portion 21 is fitted with the main body portion 23 which is concave inward, and the tab 11 on this side covers the bent portion 21 from the outer side of the bent portion; at one end of current collector set as the flat plate structure, the tab 11 covers the flat plate structure from the outer side of the flat plate structure, an outer surface of the flat plate structure on the current collector is in the same plane with the outer surface of the bending part 21, so that the outer surfaces of the tabs 11 on the both sides of the electrode assembly 1 along the width direction are flush with each other.

As shown in FIG. 12A and FIG. 12B, the current collector includes: a terminal connection portion 22, located at the top of the electrode assembly 1 and configured to connect with the terminal; a main body portion 23, located on a side of the electrode assembly 1 along the length direction, the main body portion 23 can be a flat plate structure and can also be provided with a step 231 extending along the height direction; and a bent portion 21, arranged at the end part of the main body portion 23 along the width direction and configured to connect the tab 11. The tab 11 covers the bent portion 21 from the outer side, specifically, the tab 11 is fitted and welded with the bent portion 21 from the outer side of the bent portion 21, and is folded back to the bent portion 21 to be fitted with the main body portion 23. Such a structure can further reduce the space occupied by the connecting structure of the tab 11 and the current collector on the length direction.

The terminal connecting portion 22, the main body portion 23 and the bent portion 21 are integrally formed, and this structure can reduce the processing difficulty and improve the structural strength.

Further, a reinforcing rib 24 is arranged at the connection portion of the terminal connection portion 22 and the main body portion 23. Such a structure can increase the strength of the current collector to prevent deformation, and is conducive to maintaining the angle between the terminal connection portion 22 and the main body portion 23. As shown in FIG. 12A, a material on the outer side of the connection position of the terminal connection portion 22 and the main body portion 23 is partially pressed to extend to the both sides to form an inclined plane to serve as the reinforcing rib 24. The reinforcing rib 24 can be distributed on the both sides of the step 231 along the width direction.

As shown in FIG. 13A and FIG. 13B, a top face of the bent portion 21 and the terminal connection portion 22 are arranged at intervals, and a notch 25 is formed at the top of the connection position of the main body portion 23 and the bent portion 21. By providing the notch 25, the tab 11 and the bent portion 21 can be easily folded together after being welded, stress concentration at the bent portion can be prevented in the folded back state, and cracking can be prevented. For example, the notch 25 can be a process hole formed by stamping. In addition, the reinforcing rib 24 and the step 231 can also be seen via FIG. 13C and FIG. 13D.

As shown in FIG. 2, the battery unit further includes a cover plate 6 arranged on the top of the electrode assembly 1, wherein the main body portion 23 has a first portion located close to the cover plate 6 with respect to the notch 25, and the end of the first portion along the width direction is flush with the outer edge of the cover plate 6. And/or, the main body portion 23 has a second portion located away from the cover plate 6 with respect to the notch 25, the end of the second portion along the width direction extends to an inner side face of root of the tab 11, thereby preventing the tab 11 from protruding outward along the width direction after being bent.

This design can improve the overcurrent capability by increasing the width size of the current collector without increasing the overall size of the battery unit. As shown in FIG. 13B, the portions of the main body portion 23 located above and below the notch 25 can be designed as different widths, and the outer edge along the width direction of the portion of the main body portion 23 located above the notch 25 is flush with the outer side face of the bent portion 21. Thus, the width size L2 of the current collector in FIG. 13A is greater than the width size L1 of the current collector in FIG. 12A, thereby increasing the width size of the current collector.

As shown in FIG. 14, with respect to the current collection on the side where the positive terminal is located, a groove 221 is formed in the terminal connection portion 22, and specifically, the groove 221 can be formed in a position close to the main body portion 23 along the width direction. This structure reduces the partial cross-sectional area of the current collector, so that the current collector can be fused when the battery unit is in short circuit so as to form a short circuit protection.

The process of welding the tabs 11 of the battery unit shown in FIG. 1 will be described below with reference to FIG. 15 and FIG. 16. The core of this welding manner is to weld the tab 11 corresponding to the flat plate structure at first, then weld the tab 11 corresponding to the bent portion 21, and the two welding steps are alternately carried out. For the convenience of description, the two electrode assemblies 1 are respectively marked as 1A and 1B.

Figure 15:
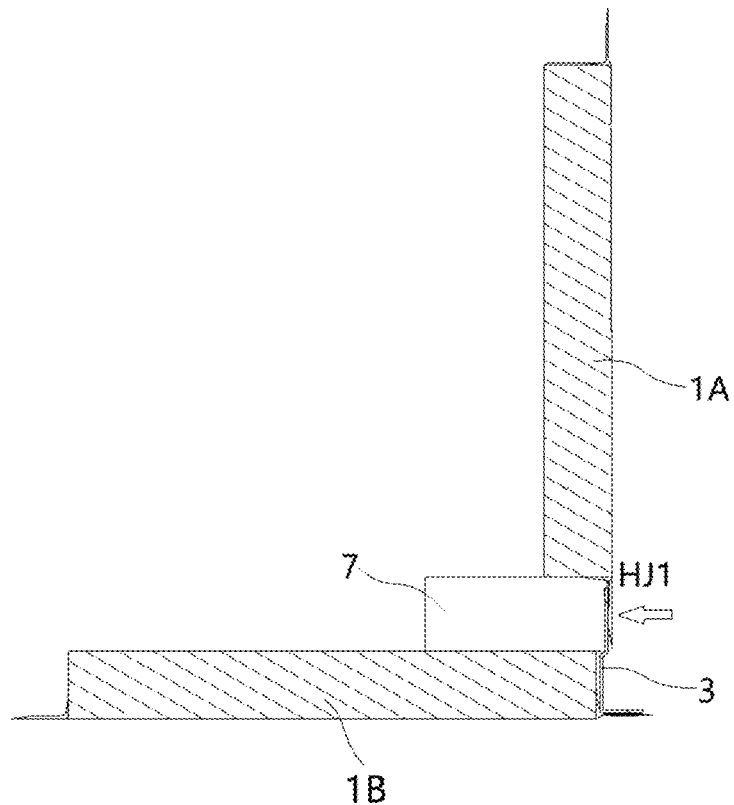
FIG. 15 and FIG. 16 are respectively schematic diagrams of welding the tabs HJ1 and HJ2 of the battery unit shown in FIG. 1.

Step (1): as shown in FIG. 15, firstly, the tab 11 at a location HJI is welded. In this process, the electrode assembly 1B is horizontally arranged, the electrode assembly 1A corresponding to the tab 11 to be welded is vertically arranged at the upper right side of the electrode assembly 1B, so that the tab 11 to be welded is fitted with the outer side of the flat plate structure in a vertical plane, and the top of the flat plate structure abuts against the root of the tab 11 to be welded. An L-shaped structure formed by the bent portion 21 and the main body portion 23 abuts against a right side face of the electrode assembly 1B and the tab 11 on the lower right side.

A supporting seat 7 is arranged on the inner side of the tab 11 for supporting the vertically disposed electrode assembly 1A and abutting against the flat plate structure, so as to apply a pressure from the right to the left on the outer side of the tab 11 for welding, the pressure direction is indicated by the arrow. A friction welding or laser welding mode can be used. The welding step provides a basis for disposing the flat plate structure at the end part of the current collector, and the welding reliability can be improved.

Step (2): after the welding of the tab 11 at the location HJI is completed, the supporting seat 7 is removed, the top of the electrode assembly 1A is rotated downward with the root of the tab 11 at the location HJI as a fulcrum, so that the electrode assembly 1A is fitted with the electrode assembly 1B. At this time, the tab 11 at the location HJI is folded back and covers the flat plate structure from the outer side.

Figure 16:
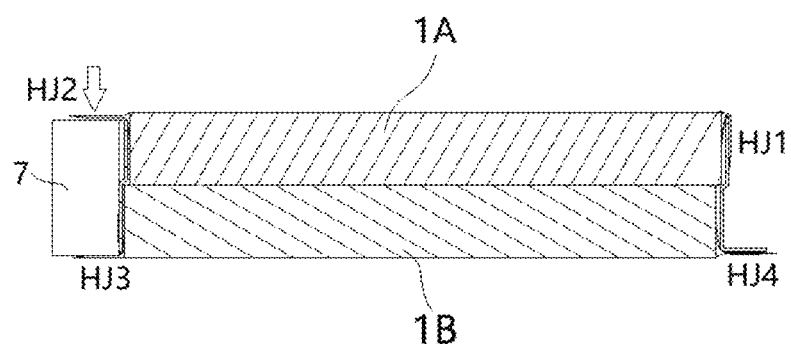

Step (3): as shown in FIG. 16, the tab 11 at a location HJ2 is welded secondly. Since the location corresponds to the bent portion 21 of the current collector, the supporting seat 7 can be directly arranged below the bent portion 21 for providing support for the bent portion 21 from the lower side, so that a pressure is applied to the outer side of the tab 11 from top to bottom, the pressure direction is indicated by the arrow.

Step (4): after the welding of the tab 11 at the location HJ2 is completed, the supporting seat 7 is removed. The electrode assembly 1A is placed at the bottom, and the electrode assembly 1B is rotated to be vertically arranged above the electrode assembly 1A, and the tab 11 at a location HJ3 is welded in accordance with the method shown in the step (1).

Step (5): the top of the electrode assembly 1B is rotated downward, so that the electrode assembly 1B is fitted with the electrode assembly 1A. At this time, the tab 11 at the location HJ3 is folded back and covers the flat plate structure from the outer side. Then, the tab 11 at a location HJ4 is welded in accordance with the method shown in the step (3).

Step (6): the welded bent portions 21 are bent together with the tab 11 to be fitted with the main body portion 23. The manner in which the bent portion 21 is welded at first and then is bent has the following advantages: under the supporting of the supporting seat 7 in the welding process, it is easy to apply the pressure to the layers of tabs 11 from the outer side of the bent portion 21, thereby optimizing the pressing effect, preventing the occurrence of a gap, and accordingly, the deformation of the tab after being bent is avoided.

In some other embodiments, the two current collectors include a first current collector 2 and a second current collector 3, which are respectively located on the both sides of each electrode assembly 1, the both ends of one of the first current collector 2 and the second current collector 3 along the width direction are the flat plate structures, the end of the other of the first current collector 2 and the second current collector 3 is provided with the bent portion 21, and the bent portion 21 can be arranged on the side of a positive terminal or a negative terminal.

Such a structure can reduce the space occupied by the connecting structure of the tab 11 and the current collector on one side of the battery unit on the whole, can increase the winding space on the side on the whole and improve the energy density in the battery unit, or can reduce the overall size of the battery unit in the case that the size of the electrode assembly 1 remains unchanged. Moreover, the structure can improve the material utilization rate of the current collector and reduce the cost. Illustration is given below via two embodiments.

As show in FIG. 17 to FIG. 22, a structural schematic diagram of another embodiment of the battery unit of the present disclosure is given, the difference with FIG. 1 lies in that, the battery unit 200 includes only one electrode assembly 1, the first end of the first current collector 2 along the width direction is the flat plate structure, the second end is provided with a bent portion 21 which is folded back towards the first end, and both ends of the second current collector 3 along the width direction are the flat plate structures.

The structure is suitable for the situation in which the lamination thickness of electrode layers is relatively small, the overall space occupied by the connecting structure of the tab 11 and the second current collector 3 on one side of the battery unit can be reduced, and the reduced thickness is the thickness of the bent portion 21.

Figure 18:
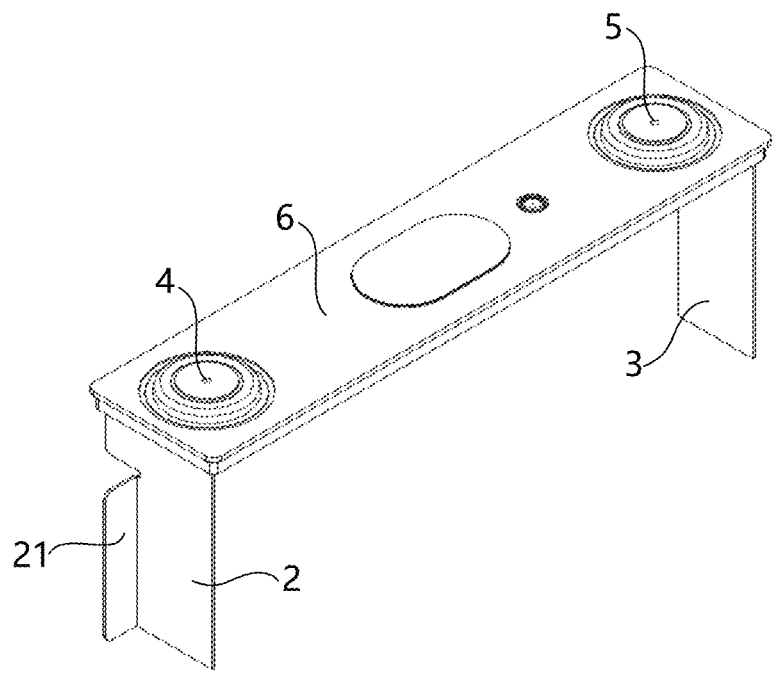
FIG. 18 is a perspective view of the bent portion of the current collector in the unfolded back state in the battery unit shown in FIG. 17.

As shown in FIG. 18, the second end of the first current collector 2 is provided with the bent portion 21 which is folded back towards the first end, and the bent portion offsets inward for a predetermined distance with respect to the edge of the end part of the current collector along the width direction.

Such a structure is applicable to the embodiments of one electrode assembly 1 as well as other embodiments. In some embodiments, at least one side of the current collector along the width direction is provided with a bent portion 21 which is folded back towards the opposite end, and the bent portion 21 offsets inward for a predetermined distance with respect to the edge of the end part of the current collector along the width direction.

When the lamination thickness of layers of the tabs 11 is relatively large, the tabs 11 can be easily bent, and the covering length when the tabs 11 bypass the bent portion 21 can be reduced, thereby reducing the total length of the tabs 11 and saving the material. Moreover, it is conducive to fitting the tabs 11 with the bent portion 21, thereby further reducing the size of the battery unit along the length direction.

Figure 19:
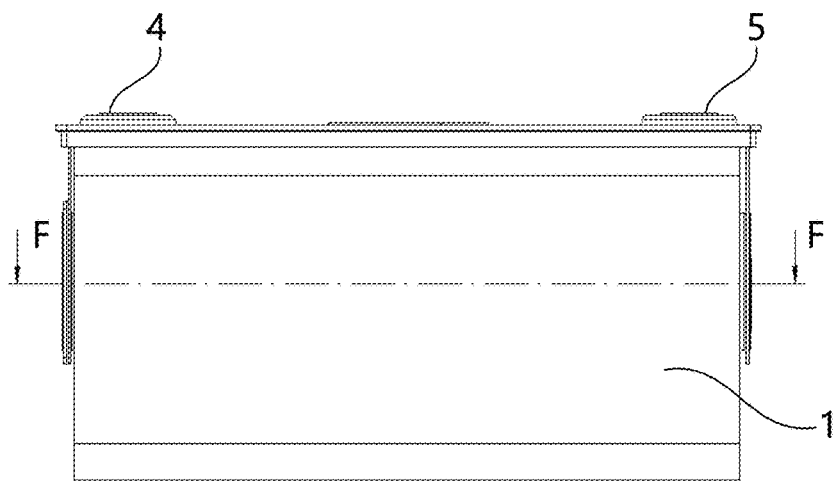
FIG. 19 is a front view of the battery unit shown in FIG. 17.
Figure 20:
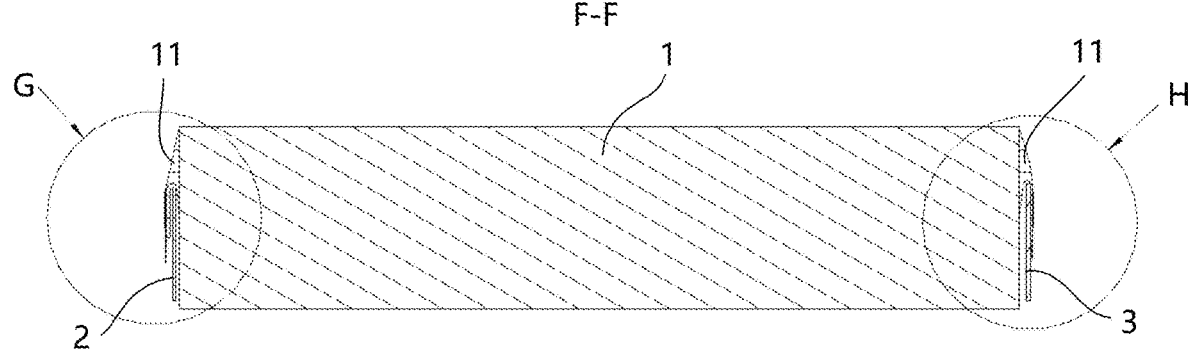
FIG. 20 is an F-F section view of the battery unit shown in FIG. 17.
Figure 21:
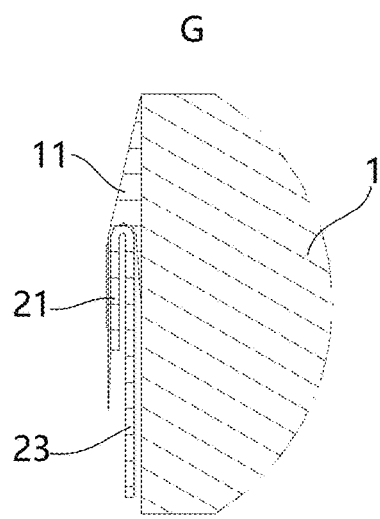
FIG. 21 and FIG. 22 are respectively enlarged views of a location G and a location H of the battery unit shown in FIG. 20.
Figure 22:
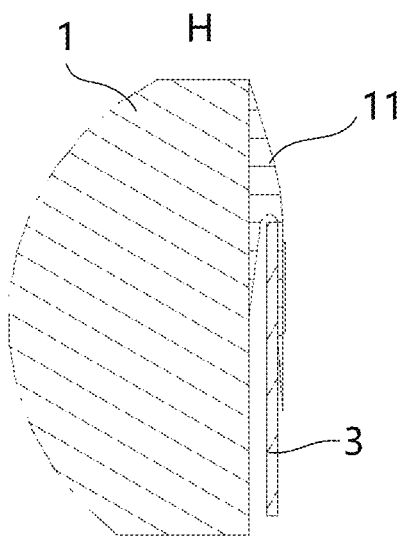

FIG. 19 is a front view of FIG. 17, FIG. 20 is an F-F section view of FIG. 19, in the section view of a location Gas shown in FIG. 21, the tab 11 is covered from the outer side of the bent portion 21, after the tab 11 and the bent portion 21 are folded back as a whole, the bent portion 21 is fitted with the main body portion 23, the root of the tab 11 does not need to be bent to form a circular arc-shaped structure, but form a slope-shaped structure, so that the length of the tab 11 can be reduced. In the section view of a location H as shown in FIG. 22, the tab 11 is directly covered from the outer side of the flat plate structure, and two side faces of the flat plate structure are fitted with the tab 11.

Figure 23:
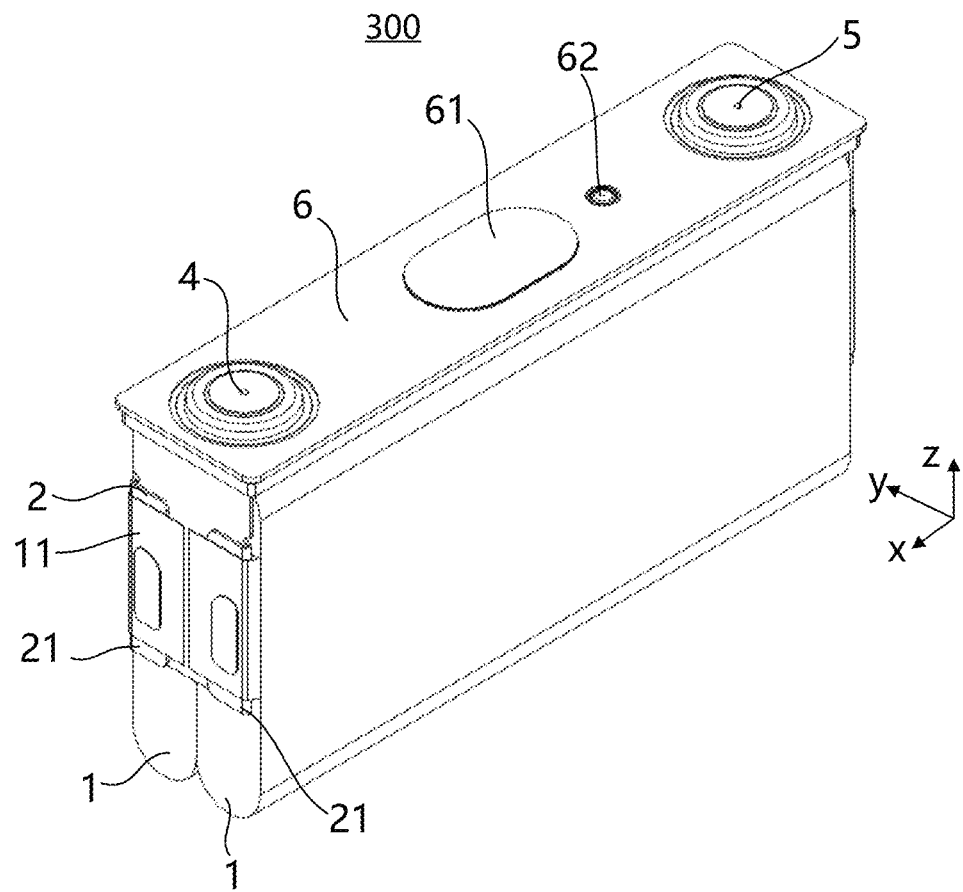
FIG. 23 is a perspective view of the bent portion of the current collector in the folded back state in another embodiment of the battery unit of the present disclosure.

As shown in FIG. 23 to FIG. 28, a structural schematic diagram of another embodiment of the battery unit of the present disclosure is given. As shown in FIG. 23, the battery unit 300 includes at least two electrode assemblies 1, both ends of the first current collector 2 along the width direction are respectively provided with a bent portion 21, and the two bent portion 21 are bent towards each other, and both ends of the second current collector 3 along the width direction are the flat plate structures.

Such a structure is suitable for a situation in which the lamination thickness of electrode layers is relatively large, by providing a plurality of electrode assemblies 1, the spaces on the outer sides of the circular arcs on the both sides of the electrode assemblies 1 can be fully utilized, and the energy density of the battery core can be improved. By adoption of the present embodiment, the space occupied by the connecting structure of the tab 11 and the second current collector 3 on one side of the battery unit can be reduced on the whole, the winding space on the side can be increased on the whole, and the energy density in the battery unit can be improved, or the overall size of the battery unit can be reduced in the case that the size of the electrode assembly 1 remains unchanged.

Figure 24:
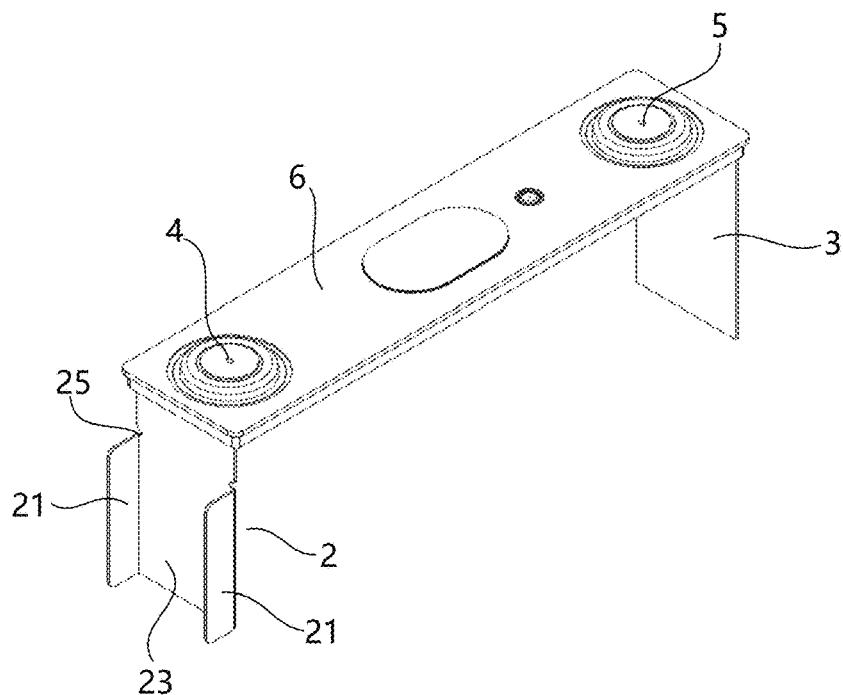
FIG. 24 is a perspective view of the bent portion of the current collector in the unfolded back state in the battery unit shown in FIG. 23.

As shown in FIG. 24, both ends of the first current collector 2 along the width direction are provided with the bent portions 21, and the two bent portions 21 have the same size and shape, both of the bent portions 21 are rectangular structures and can be perpendicular to the main body portion 23 before being folded back. Notches 25 are formed at the tops of the connection positions of the bent portions 21 and the main body portion 23.

Figure 25:
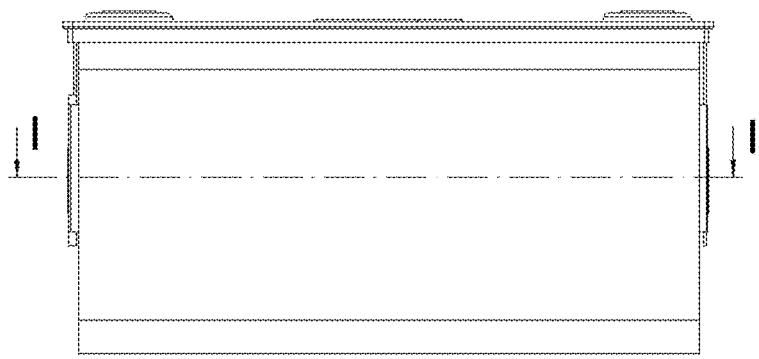
FIG. 25 is the front view of the battery unit shown in FIG. 23.
Figure 26:
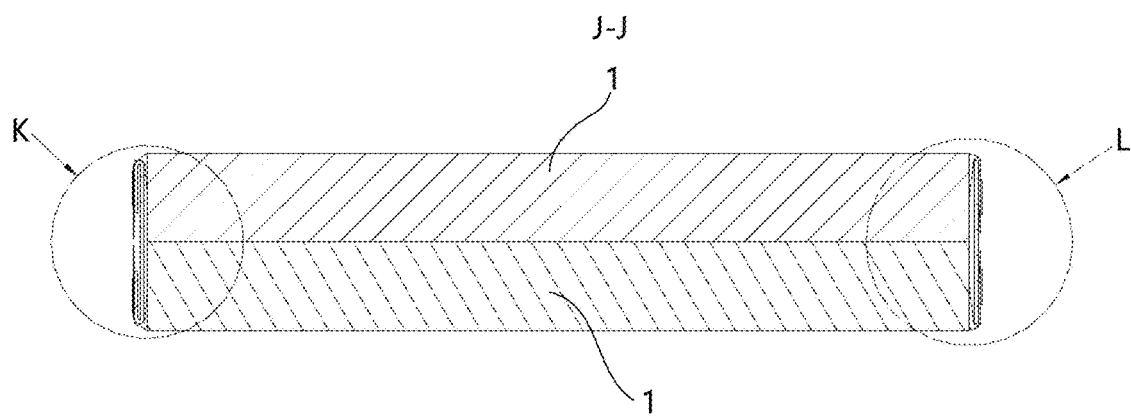
FIG. 26 is a J-J section view of the battery unit shown in FIG. 25.
Figure 27:
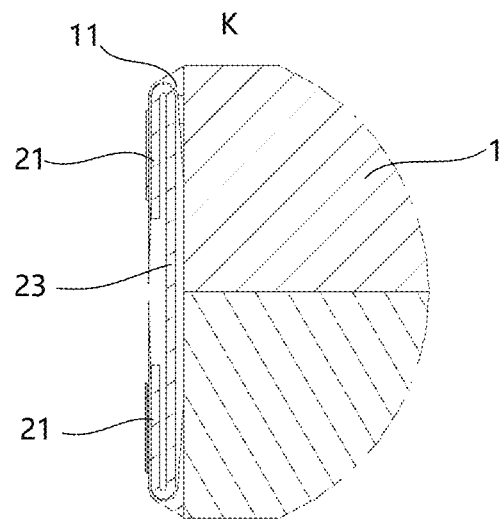
FIG. 27 and FIG. 28 are respectively enlarged views of a location K and a location L of the battery unit shown in FIG. 26.
Figure 28:
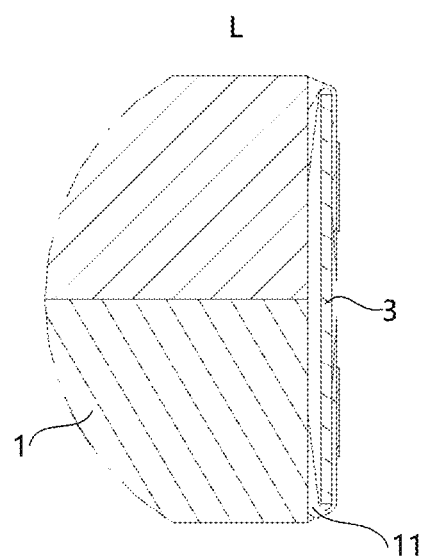

FIG. 25 is the front view of the battery unit shown in FIG. 23, FIG. 26 is a J-J section view of the battery unit shown in FIG. 25, in the section view of a location K as shown in FIG. 27, the tabs 11 of the two electrode assemblies 1 located on one side along the length direction of the main body 23 are covered from the outer side of the bent portion 21, and after the tabs 11 and the bent portion 21 are folded back as a whole, the bent portion 21 is fitted with the main body portion 23. In the section view of a location L as shown in FIG. 28, the tabs 11 of the two electrode assemblies 1 located on one side along the length direction of the main body 23 are directly covered from the outer side of the flat plate structure, and two side faces of the flat plate structure are fitted with the tabs 11. The structure forms a symmetrical structure with respect to the bonding surfaces of the two electrode assemblies 1, and the tabs 11 on the both sides along the width direction can be easily flush with the outer side after being folded back, and the tabs are pressed in place after being folded back from the outer side as a whole via a tool.

The embodiments in which two electrode assemblies 1 are provided are given above. In addition, the battery unit can further include more than two electrode assemblies 1, the tabs 11 of the electrode assemblies 1 are led out from the both sides of the current collector along the width direction, a plurality of tabs 11 are arranged on at least one side along the height direction of the current collector, and the tabs 11 on the same side are staggered completely along the height direction. The embodiment can be applied to the situation in which the lamination thickness of the electrode layers is relatively large.

For example, the battery unit includes an even number of electrode assemblies, on the height direction of the battery unit, the tabs on one side on the thickness direction are relatively bent with the tabs on the other side, and the different pairs of tabs are staggered on the height direction.

Secondly, the present disclosure further provides a battery module, in some embodiments, the battery module includes: a shell; and a plurality of battery units in above embodiments, wherein the battery units are arranged in the shell and are arranged side by side along the width direction. A single battery unit can be singly provided with a sub-shell, and the sub-shell can also be omitted.

The battery unit and the battery module provided by the present disclosure are described in detail above. The principles and the embodiments of the present disclosure have been described herein by using specific embodiments, and the description of the above embodiments is only used for assisting to understand the method of the present disclosure and its core idea. It should be noted that those of ordinary skill in the art can make several improvements and modifications to the present disclosure without departing from the principles of the present disclosure, and these improvements and modifications shall also fall within the protection scope of the claims of the present disclosure.

What is claimed is:

1. A battery unit, comprising:
   an electrode assembly, comprising a first electrode and a second electrode, which have opposite polarities, each of the first electrode and the second electrode comprising a coated portion and an uncoated portion, the uncoated portion being located at an end of the coated portion in a length direction of the electrode assembly and forming a tab;

two terminals, arranged at a top of the electrode assembly;

two current collectors electrically connecting the tabs on both sides of the electrode assembly with the terminals on a same side respectively, at an end of the electrode assembly in the length direction, wherein at least one end, in a width direction of the electrode assembly, of at least one of the current collectors is a flat plate structure and provided with no bent portion, the tab covers the flat plate structure from an outer side after being bent, and both sides of the flat plate structure extending in the width direction are in direct contact with the tab, and wherein at least one of the current collectors comprises:

a terminal connection portion, located at the top of the electrode assembly and connected with the terminal;

a main body portion, located at the end of the electrode assembly in the length direction; and a bent portion, arranged at an end of the main body portion in the width direction and connected with the tab, wherein the tab is bent from the outer side to cover the bent portion, and the bent portion is in direct contact with the main body portion after being folded.

2. The battery unit according to claim 1, comprising at least two of the electrode assemblies, wherein the two current collectors are a first current collector and a second current collector respectively located on the both sides of the electrode assemblies, one end of each of the first current collector and the second current collector in the width direction is the flat plate structure, and another end of each of the first current collector and the second current collector in the width direction is provided with the bent portion which is folded towards an opposite end.

3. The battery unit according to claim 2, wherein all the bent portions are located on a same side or different sides of the electrode assembly extending in the width direction.

4. The battery unit according to claim 2, wherein the electrode assembly on a side of the flat plate structure protrudes outwards in the length direction with respect to the electrode assembly on a side of the bent portion, each of the two current collectors comprises the main body portion, the bent portion is arranged on the end of the main body portion in the width direction, the main body portion is bent to form a step at a position where the two electrode assemblies are adjacent, and the step is configured to adapt to a protrusion direction and a size of the electrode assembly.

5. The battery unit according to claim 1, wherein the two current collectors comprise a first current collector and a second current collector, which are respectively located on the both sides of the electrode assembly, and both ends of one of the first current collector and the second current collector in the width direction are the flat plate structures.

6. The battery unit according to claim 5, comprising only one electrode assembly, wherein a first end of the first current collector in the width direction is the flat plate structure, a second end of the first current collector is provided with the bent portion which is folded back towards the first end, and both ends of the second current collector in the width direction are the flat plate structures.

7. The battery unit according to claim 5, comprising at least two of the electrode assemblies, wherein both ends of the first current collector in the width direction are respectively provided with the bent portion, and the two bent portions are bent towards each other, both ends of the second current collector in the width direction are the flat plate structures.

8. The battery unit according to claim 1, comprising at least two of the electrode assemblies, wherein the tabs of the electrode assemblies are led out from both sides of the current collector extending in the width direction, and the tabs on both sides of the current collector have no overlapping portion in the length direction after being folded.

9. The battery unit according to claim 1, comprising at least two of the electrode assemblies, wherein the tabs of the electrode assemblies are led out from the both sides of the current collector along the width direction, a plurality of the tabs are arranged on at least one side along a height direction of the current collector, and the tabs on a same side are staggered completely along the height direction.

10. The battery unit according to claim 1, wherein a reinforcing rib is arranged at a connection portion of the terminal connection portion and the main body portion.

11. The battery unit according to claim 1, wherein a top face of the bent portion and the terminal connection portion are arranged at intervals, and a notch is formed on a top of a connection portion of the main body portion and the bent portion.

12. The battery unit according to claim 11, further comprising a cover plate arranged on the top of the electrode assembly, wherein the main body portion has a first portion located closer to the cover plate than to the notch, and an end of the first portion along the width direction is flush with an outer edge of the cover plate; and/or wherein the main body portion has a second portion located farther away from the cover plate than the notch, and an end of the second portion along the width direction extends to an inner side face of a root of the tab.

13. The battery unit according to claim 1, wherein the terminal connection portion, the main body portion and the bent portion are integrally formed.

14. The battery unit according to claim 1, wherein at least one end of the current collector in the width direction is provided with the bent portion which is folded back towards an opposite end, and the bent portion offsets inward for a predetermined distance with respect to an edge of the opposite end.

15. A battery module, comprising:
a shell; and
a plurality of battery units according to claim 1, wherein the battery units are arranged in the shell and are arranged side by side along the width direction.

* * * * *